United States Patent [19]

Muso et al.

[11] Patent Number: 5,678,760
[45] Date of Patent: Oct. 21, 1997

[54] COOLING SYSTEM OF ELECTRIC AUTOMOBILE AND ELECTRIC MOTOR USED THEREFOR

[75] Inventors: Masanori Muso; Keiji Oda, both of Katsuta; Osamu Koizumi, Ibaraki-machi; Hiroshi Hamano, Katsuta, all of Japan

[73] Assignees: Hitachi, Ltd.; Hitachi Automotive Engineering Co., Ltd., both of Japan

[21] Appl. No.: 128,217

[22] Filed: Sep. 29, 1993

[30] Foreign Application Priority Data

Oct. 1, 1992 [JP] Japan ................... 4-263383

[51] Int. Cl.⁶ .................. B60K 6/02; B60K 11/02
[52] U.S. Cl. .......... 237/2 A; 180/65.1; 180/65.8; 165/41; 237/12.3 B; 429/62; 429/120
[58] Field of Search ............... 180/65.1, 65.2, 180/65.8; 429/62, 120; 165/41; 237/12.3 B, 12.3 A, 12.3 R, 5, 2 A; 123/41.31

[56] References Cited

U.S. PATENT DOCUMENTS

| | | | |
|---|---|---|---|
| 3,110,633 | 11/1963 | Bachmann | 429/62 |
| 3,309,234 | 3/1967 | Rundles | 429/62 |
| 4,331,209 | 5/1982 | Bauer et al. | 180/65.1 |
| 4,864,974 | 9/1989 | Aso | 123/41.31 |
| 4,980,588 | 12/1990 | Ogawa | 123/41.31 |
| 5,036,803 | 8/1991 | Nolting et al. | 123/41.1 |
| 5,058,660 | 10/1991 | Hedstrom | 165/47 |
| 5,280,852 | 1/1994 | Dauvergne | 237/12.3 B |
| 5,291,960 | 3/1994 | Brandenburg et al. | 237/12.3 B |
| 5,531,285 | 7/1996 | Green | 180/65.2 |

FOREIGN PATENT DOCUMENTS

| | | | |
|---|---|---|---|
| 0 484 548 A1 | 11/1991 | European Pat. Off. | |
| 36 01 089 A1 | 5/1987 | Germany. | |
| 37 38 412 A1 | 5/1989 | Germany. | |
| 9001590.8 | 5/1990 | Germany. | |
| 92 02 466.1 | 2/1992 | Germany. | |
| 47-31317 | 11/1972 | Japan. | |
| 48-60207 | 8/1973 | Japan. | |
| 0182525 | 11/1982 | Japan | 180/65.1 |
| 1-131256 | 9/1989 | Japan. | |
| 92/12022 | 7/1992 | WIPO | 237/5 |
| 92/16389 | 10/1992 | WIPO. | |
| 93/02884 | 2/1993 | WIPO | 180/65.2 |

OTHER PUBLICATIONS

Thompson, Francis T. "Advanced Electronic Control Systems for Electric Vehicles" Proceedings of International Conference on Automotive Electronics and Electric Vehicles Dearborn Michigan (20–22 Sep. 1976) pp. 1–9.

Primary Examiner—John K. Ford
Attorney, Agent, or Firm—Evenson, McKeown, Edwards & Lenahan, P.L.L.C.

[57] ABSTRACT

A cooling system for an electric automobile is characterized in that a heat source is forcibly cooled with a coolant of non-freeze solution, forcibly recirculated through a pipe.

3 Claims, 12 Drawing Sheets 5,678,760

1

COOLING SYSTEM OF ELECTRIC AUTOMOBILE AND ELECTRIC MOTOR USED THEREFOR

BACKGROUND OF THE INVENTION

This invention relates to a cooling system of an electric automobile and, more particularly, to an electric vehicle cooling system which is suitable to cool heat-generating sections by recirculating liquid coolant.

In general, many cooling and heating apparatus of electric automobiles are of air-cooling type, as disclosed in JP A 47-31317 (1972). As for cooling of electric motor sections, hitherto, there are known a plurality of methods one of which, as disclosed in JP A 48-60207 (1973), employs a pipe for coolant flow provided on an outer periphery of the stator, another method, as in JU A 1-131256 (1989), employs a spiral flow passage provided in a frame on the outer periphery of the stator.

Electric motors are in tendency of high output and large scale because of requirements to increase running performance of automobiles, and an amount of heat generated in the electric motors and controllers increases remarkably according to expansion of environments of use thereof.

Power source of an electric automobile is mainly a battery, and development of the battery becomes more active recently. In particular, it becomes necessary to retain the heat of the battery because battery characteristics decrease rapidly at low temperature.

Further, it is known to use power of the battery for heating a resistive wire heater for room-inside heating in winter because the electric automobile is less in heat capacity than an internal combustion engine automobile.

In the above-mentioned conventional techniques, it can not be expected to attain stable cooling and heating because the electric motors and the controllers are of air-cooling type and easily influenced by the outside air temperature.

SUMMARY OF THE INVENTION

An object of the invention is to provide a cooling system of an electric vehicle such as automobile which is capable of stable cooling irrespective of seasons.

Another object of the invention is to provide a cooling system of an electric vehicle which is able to assist heating of the automobile room-inside by effectively using the heat generated in an electric motor and a controller and to suppress a decrease in battery characteristics by retaining the heat of the battery.

Further another object of the invention is to provide a structure which is able to cool effectively an electric motor or a controller.

One of the objects of the invention is carried out by using anti-freeze solution as a coolant and forcibly recirculating the anti-freeze solution around a heat source through a pipe.

Another one of the objects of the invention is carried out by recirculating the heat generated in an electric motor and a controller through a battery and providing a heater-heating passage which is switchable with a coolant passage for the electric motor and controller, by valve means.

Further another one of the objects of the invention is carried out by providing a cooling pipe adjacent to a heat generation section of an electric motor or a controller.

Anti-freeze solution as a coolant flowing in a cooling pipe flows on peripheries of a controller and an electric motor and is heat-exchanged with the heat generated in the controller

2 and electric motor to cool it. The heated anti-freeze solution is forcibly cooled by a radiator and recirculated by a pump to be supplied again for cooling.

A fan motor operates to cool the radiator, and it operates together with an electric pump to effectively cool when outside air temperature is high.

BRIEF DESCRIPTION OF THE DRAWINGS

FIG. 10a is a plan view of a controller, showing an arrangement of cooling pipe of the embodiment of the invention;

FIG. 10b is a sectional view of the cooling pipe taken along a line 10b—10b in FIG. 10a;

FIG. 11b is a sectional view of the cooling pipe taken along a line 11b—11b in FIG. 11a;

FIG. 11c is a sectional view of the cooling pipe taken along a line 11c—11c in FIG. 11a;

FIG. 11d is a bottom view of the controller in FIG. 11a;

FIG. 21b is a side view of FIG. 21a.

DESCRIPTION OF THE EMBODIMENTS

Figure 1:
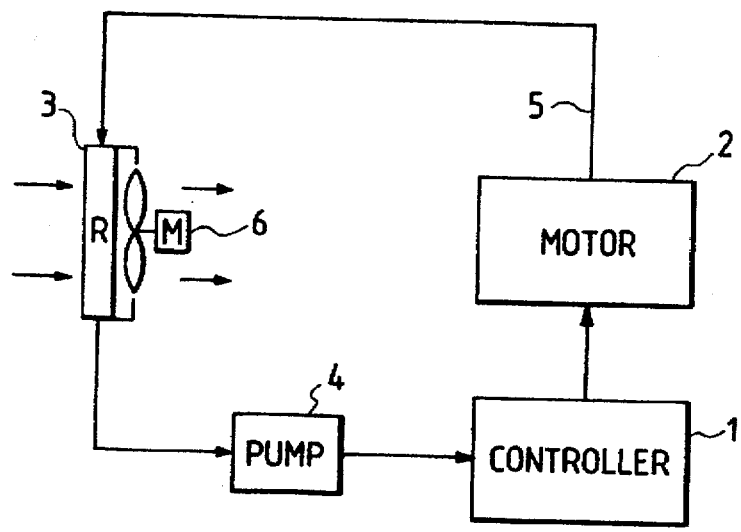
FIG. 1 is a schematic diagram showing a cooling system of an embodiment of the invention.

An embodiment of the invention will be described hereunder referring to the drawings.

FIG. 1 shows a cooling system of a controller and an electric motor for electric vehicle. The cooling system comprises a cooling pipe 5 arranged for cooling a controller 1 controlling output of an electric motor and the electric motor 2 driving wheels, a radiator 3 for cooling a coolant and electric pump 4.

In the cooling pipe 5, a coolant of anti-freeze solution is enclosed. On the side of the radiator 3, a radiator fan motor 6 is provided for forcibly cooling the coolant.

In the above construction, an amount of heat generated in the controller 1 is nearly equal to an amount of heat generated in the electric motor 2, but a temperature of the heat generated in electronic parts constituting the controller 1 such as transistors, condensers, etc. is 150° C. or higher which is very high, and thermal condition is very sever for electronic parts which are low in heat resistance. Therefore, as for cooling order of the system, the controller 1 and the electric motor 2 are arranged so that the controller 1 is cooled first and then the electric motor 2, which is higher in heat resistance, is cooled thereby to provide effective cooling under well heat balanced conditions.

Maximum cooling is required in summer and at the time that the outside air temperature is high, that is, usually, at the time that the outside air temperature is 40° C. or higher according to an environment test specification of an automobile maker. At such a time, it is necessary to set the capacity of the radiator 3, a flow rate of the radiator fan motor 6 and a circulation flow rate of the electric pump 4 so that the cooling is sufficient when the electric motor 2 is in full power. However, there are cases the outside air temperature lowers to around a room temperature and the controller 1 and the electric motor 2 are unnecessary to be cooled so much. An embodiment suitable for such cases is explained, referring to FIG. 2.

Figure 2:
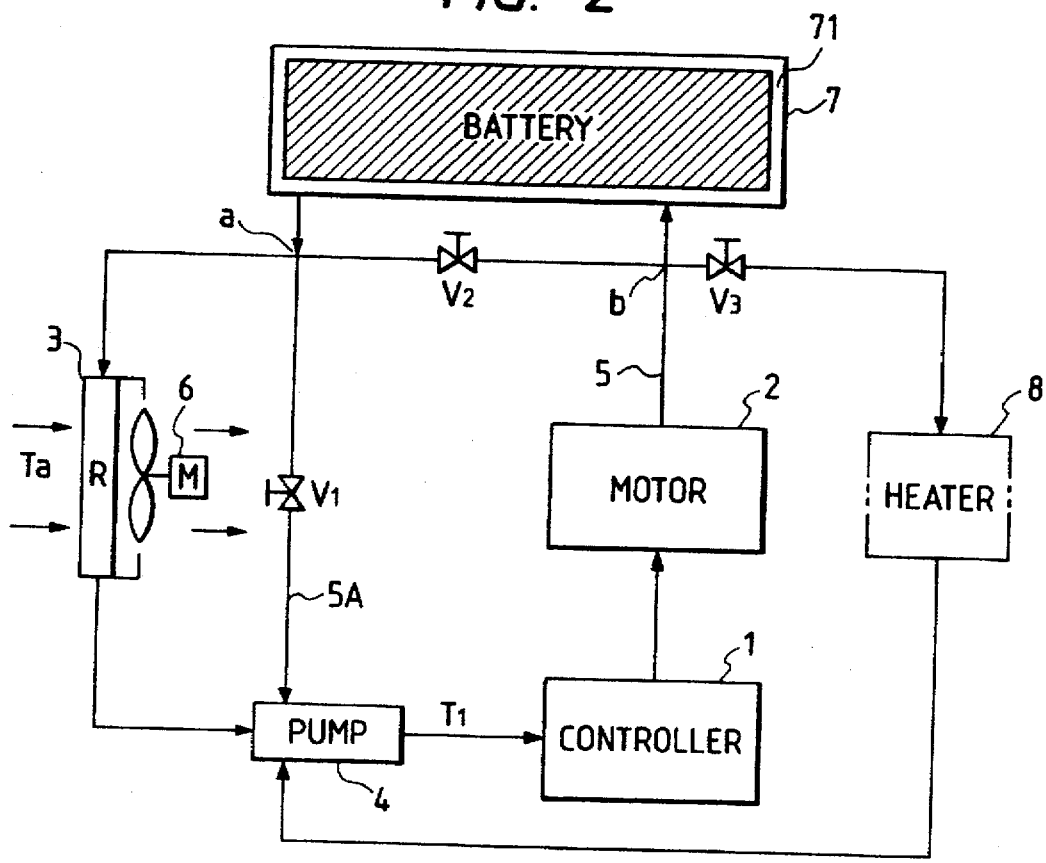
FIG. 2 is a schematic diagram showing a cooling system of another embodiment of the invention.

In FIG. 2, although a principal cooling circuit is the same as FIG. 1, a casing 7 of a battery is connected, in parallel, to intermediate connecting portions a and b of the cooling pipe 5 between the electric motor 2 and the radiator 3, and a heater 8 and a valve V3 are provided between the intermediate connecting portion b and the pump 4 so that the coolant can flow therethrough via the valve V3. A pipe 5A with a valve V1 is connected between the intermediate connecting portion a and the pump 4. A valve V2 is provided between the intermediate connecting portions a and b.

Functions of the cooling system in FIG. 2 will be explained referring to the following table:

TABLE 1

| | Water Path | Fan Motor | V1 | V2 | V3 | Remarks |
|---|---|---|---|---|---|---|
| (1) Summer | C-Mo-R-P | On | Close | Open | Close | Outside air temp. is high. |
| (2) | C-Mo-R-P | On, Off | Close | Open | Close | Fan off at T1 ≦ 45. |
| (3) | C-Mo-V2-V1-P | Off | Open | Open | Close | VI at T, ≧65° C. |
| (4) | C-Mo-V3-H-P | Off | Close | Close | Open | Open V2 when temp. rises. |
| (5) Winter | C-Mo-B-V1-P | Off | Open | Close | Close | Close V1 and open V2 when temp. rises. |

PASSAGE RESISTANCE; B>>V2

In the above table 1, symbols C, Mo, B, P and R express the controller 1, the electric motor 2, the battery casing 7, the pump 4 and the radiator 3, respectively.

As for coolant path or water path taken according to change in outside air temperature, in case (1) the outside air temperature is high in summer, that is, 40° C. or higher, a coolant path C-Mo-R-P is taken, in which it is unnecessary to retain the heat of the battery, and the valve V2 is opened so that the controller 1 and the electric motor 2 are cooled by the coolant cooled fully by the radiator 3. In this case, the cooling pipe 5 is connected to a cooling path 71 of the battery case 7 to form a recirculation path, however, since the cooling path 71 has a high passage resistance, the coolant flows in a short circuit through the valve 2, and the valves V1 and V3 are closed. In case (2) forcible cooling is effected according to environments even if the outside air temperature is relatively cool, that is, it is less than ordinary temperature, valve opening and closing conditions are the same as the case (1). A value of a water temperature sensor T1 disposed at an inlet of the controller 1 is detected, and the valve V2 is closed and the radiator fan motor 6 is turned off at the value of 45° C. or so, that is, in a temperature range in which heat resistance of the electronic parts can be secured, because the forcible cooling is unnecessary in such a temperature range.

Figure 5:
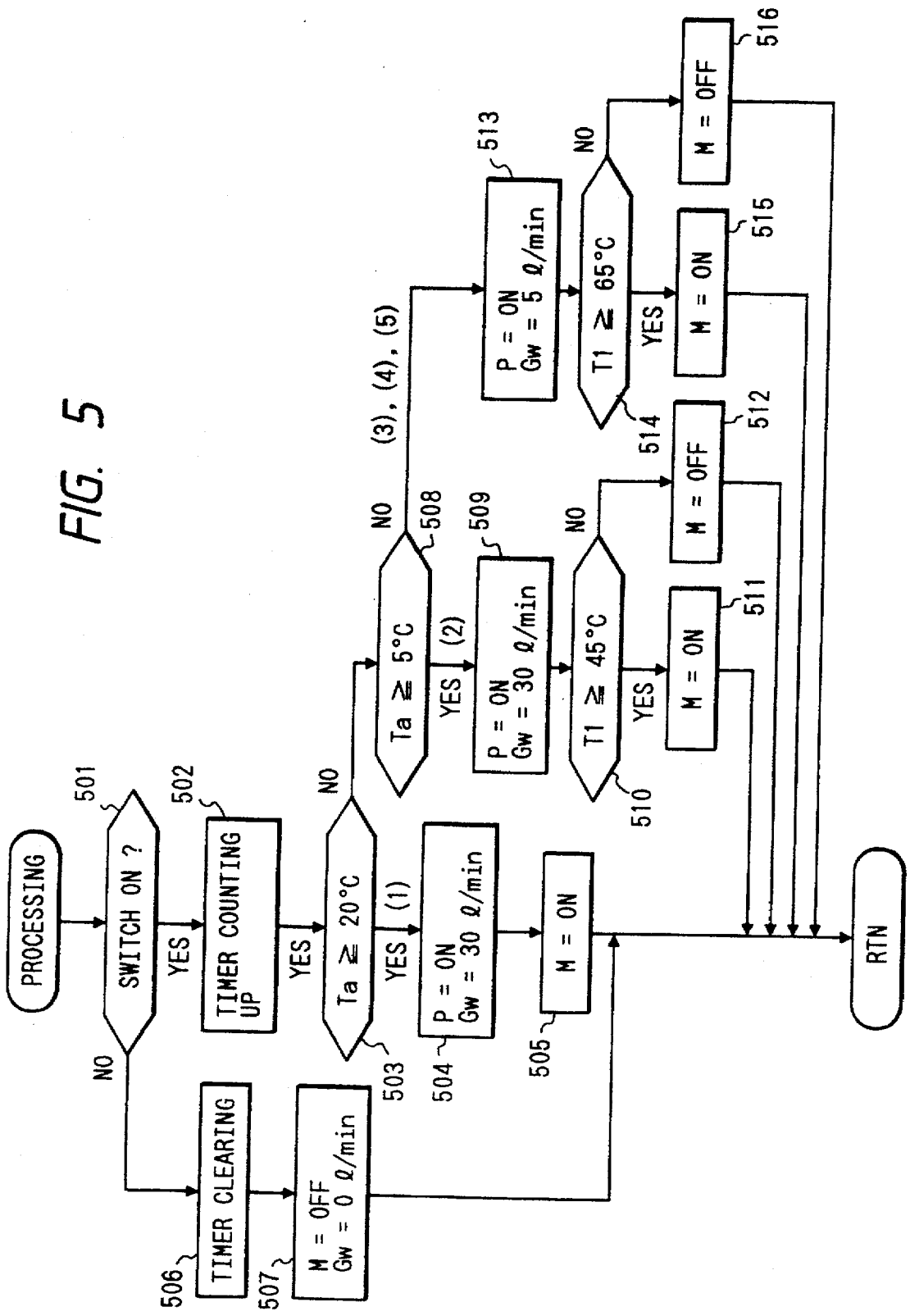
FIG. 5 is a flow chart of control in the embodiment shown in FIG. 2.

In case (3) the outside air temperature lowers further to about 5° C. in winter, the valve V1 is opened and the coolant short-circuits the radiator 3 and is returned to the pump 4. At this time, basically, the radiator-fan motor 6 is turned off. However, when the inlet water temperature sensor T1 reaches to 65° C. or higher, the valve V1 is closed and the coolant is recirculated through the radiator 3. At this time, the fan motor 6 is turned on. In case (4) the outside air temperature lowers further, the valve V2 is closed and the valve V3 is opened, whereby the hot coolant is flowed into the heater 8 and recirculated to the pump 4. In this case, also, when the inlet water temperature sensor T1 reaches to 65° C. or higher, the valve V2 is opened and a part of the coolant is recirculated through the radiator 3, whereby the temperature of the coolant is lowered, and the cooled coolant is returned to the pump 4. At this time, also, when T1≧65° C., the radiator-fan motor 6 is turned on, as shown in FIG. 5.

In case (5) the outside air temperature lowers further, the valve V1 is opened, the valve V2 is closed and the valve V3 is closed, whereby the hot coolant from the motor 2 is recirculated through the cooling path 71 of the battery case 7, and when the coolant temperature rises to a predetermined temperature, the valve V1 is closed and V3 is opened thereby to recirculate the coolant through the radiator 3. By repeating this operation, cooling and heating can be effected effectively under an energy-saving condition. Order of the above-mentioned patterns (3), (4), (5) to the outside air temperature changes according to the capacity of the battery and heater.

Figure 3:
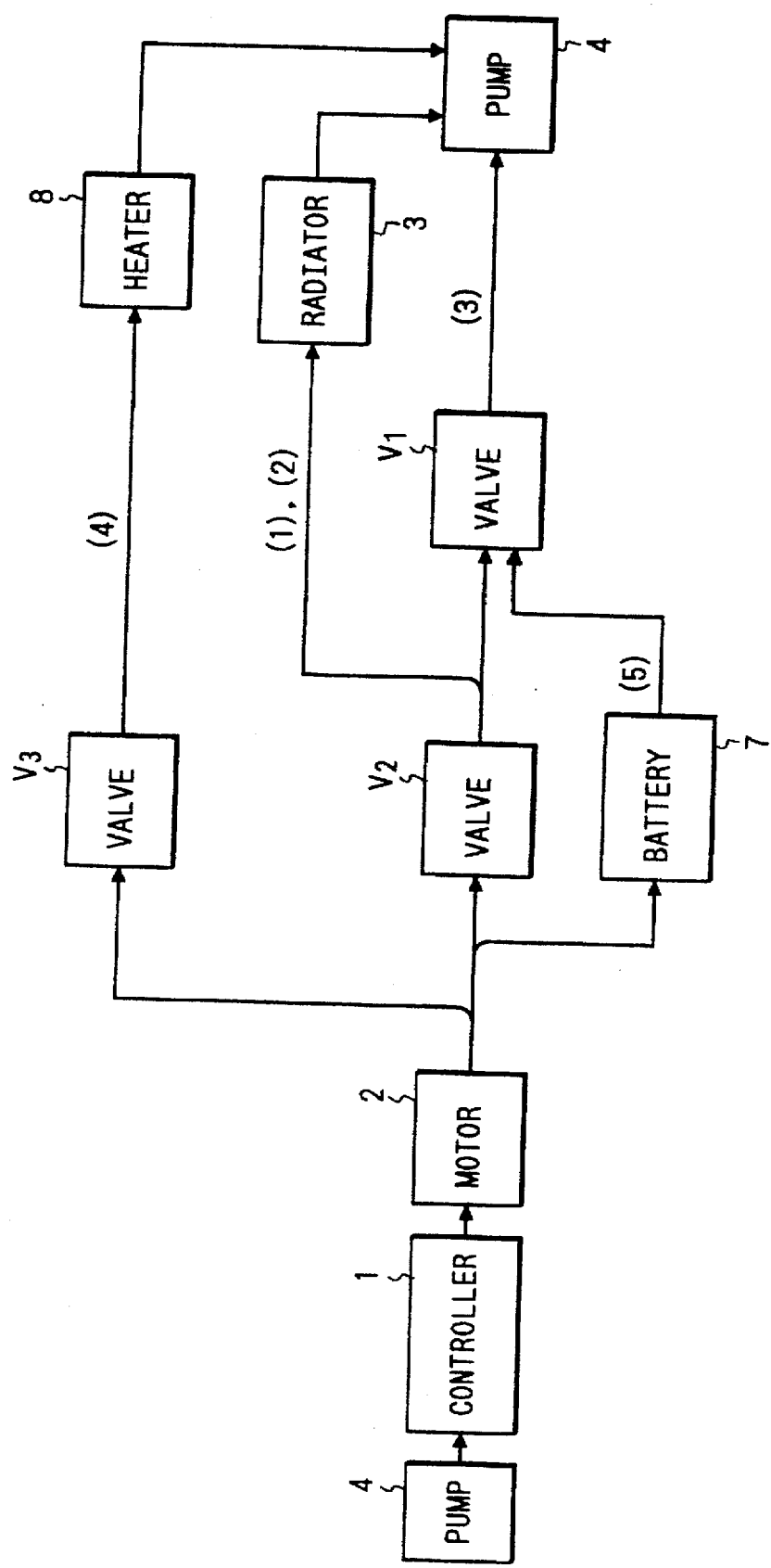
FIG. 3 is a flow diagram showing cooling flow passage of the embodiment shown in FIG. 2.

FIG. 3 shows diagrammatical illustration of the above table in which (1) to (5) represent the above-mentioned coolant paths or coolant flow patterns as well as the outside air temperature conditions.

Figure 4:
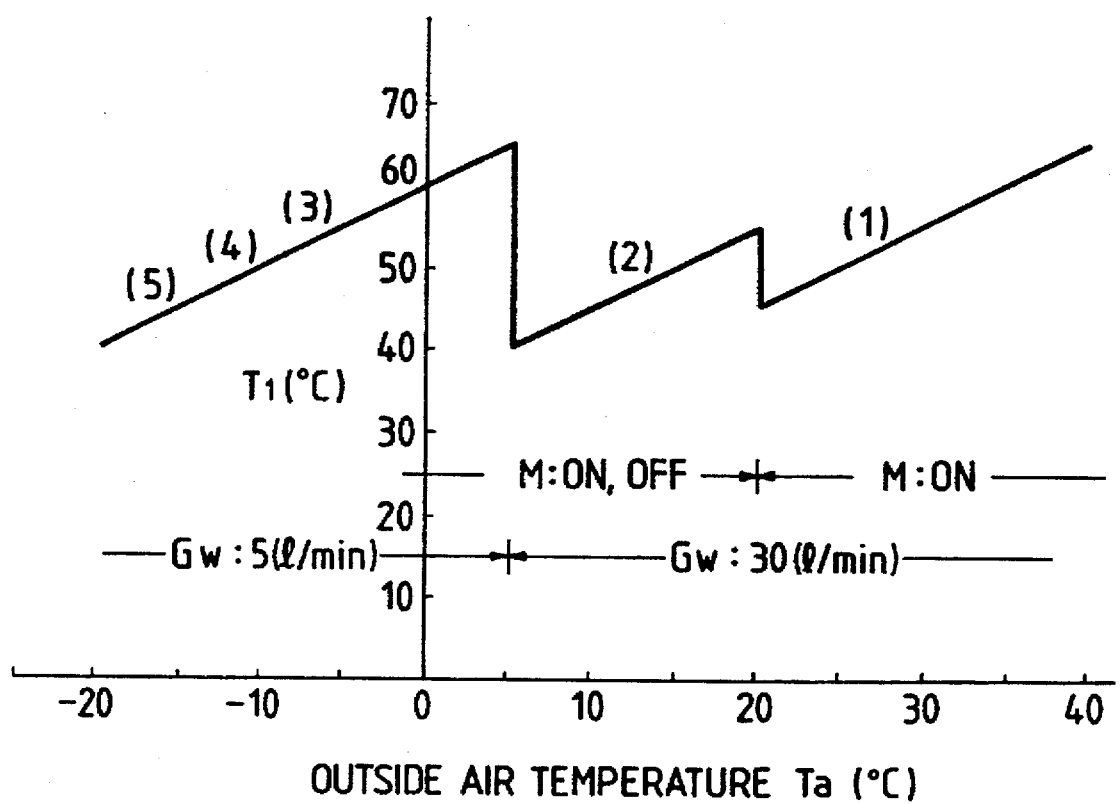
FIG. 4 is a graph showing temperature condition of a sensor T1 at an inlet of a controller, which sensor is used in the present invention.

FIG. 4 shows conditions of on-off control of the radiator-fan motor 6, flow control of the pump 4 and controller inlet water temperature sensor value T1 to change of outside air temperature (Ta), in which recirculation flow rate Gm is maximum 30 l/min., for example, and the flow rate is reduced to 5 l/min. or so when the outside air temperature is lower. FIG. 5 shows a control flow of the cooling system, in which various values are shown as an example and the values change a little according to scale of the cooling system. In FIG. 5, M represents the radiator fan motor 6; switch, a starting switch; P, the electric pump 4; and Gw, a flow rate of the coolant flowed by the pump 4.

In step 501, whether or not a starting switch is on is examined. When the starting switch is off, a timer is cleared in step 506, and the radiator fan motor 6 and the pump 5 are turned off in step 507, so that a coolant flow rate Gw is 0 l/min.. In step 501, when the starting switch is on, the timer counts up in step 502. In step 503, when a value Ta of the outside air temperature sensor (Ta) is equal to or higher than a predetermined water temperature, for example, 20° C. or so, the pump 4 is turned on to recirculate the coolant at a predetermined maximum flow rate Gm, 30 l/min. in step 504. At the same time, the radiator fan motor 6 is turned on to lower the value (T1) of the water temperature sensor in step 505. (the flow pattern (1) in the table.)

When an outside air temperature sensor value Ta is lower than the predetermined value 20° C. (step 503) and equal to or higher than a predetermined value, for example, 5° C., in step 508, the pump 5 is turned on to recirculate the coolant at the maximum flow rate 30 l/min.(step 509), when the water temperature sensor value (T1) is equal to higher than a predetermined temperature, for example, 45° C., the radiator-fan motor 6 is turned on to lower the water temperature sensor value (T1) in steps 510, 511. After that, when the water temperature sensor value (T1) becomes less than the predetermined value 45° C., the radiator-fan motor 6 is turned off to reduce power consumption in steps 510, 512. (the flow pattern (2))

Further, when the outside air temperature sensor value Ta is less than a predetermined outside air temperature 5° C. in step 508, the pump 4 is turned on to recirculate the coolant at a predetermined minimum flow rate of 5 l/min. in step 513, and in step 514 when the water temperature sensor value (T1) becomes equal to or high than a predetermined value 65° C., the radiator fan motor 6 is turned on to lower the water temperature in step 515. After that, when the water temperature sensor value T1 becomes lower than the predetermined value 65° C. in step 514, the radiator fan motor 6 is turned off to raise the water temperature sensor value, whereby the coolant of the higher temperature is utilized for the other circuit thereby to effect heat utilization. (patterns (3), (4), (5))

In cases of any above flow patterns, the predetermined values have some differential for reducing hunting in on-off switching operations. For example, the differential is such that in case that the radiator-fan motor 6 is desired to effect on-off operation when the water temperature becomes 45° C., the fan motor 6 is turned on when the water temperature rises and reaches to the temperature 45° C. and the fan motor 6 is turned off when the water temperature is lowered to the water temperature 43° C., for instance, and in this case the the temperature difference 45° C.–43° C.=2° C. is differential. This is the same as in case of coolant recirculation. As in the embodiment of the present invention, the liquid or water cooling type cooling system is excellent in total as compared with a air cooling type cooling system in that a space for installation is small (by 5%), the weight is reduced (by 10%), its maintenance is better (there is no chocking in a filter as in the air cooling type), exhaust heat utilization is greater, layout is better, and so on.

Further, there is a large effect of exhaust gas utilization for saving energy of the radiator fan motor 6 and the electric motor 2, for assisting heating of the heater 8 and for improvement on the battery performance.

Figure 6:
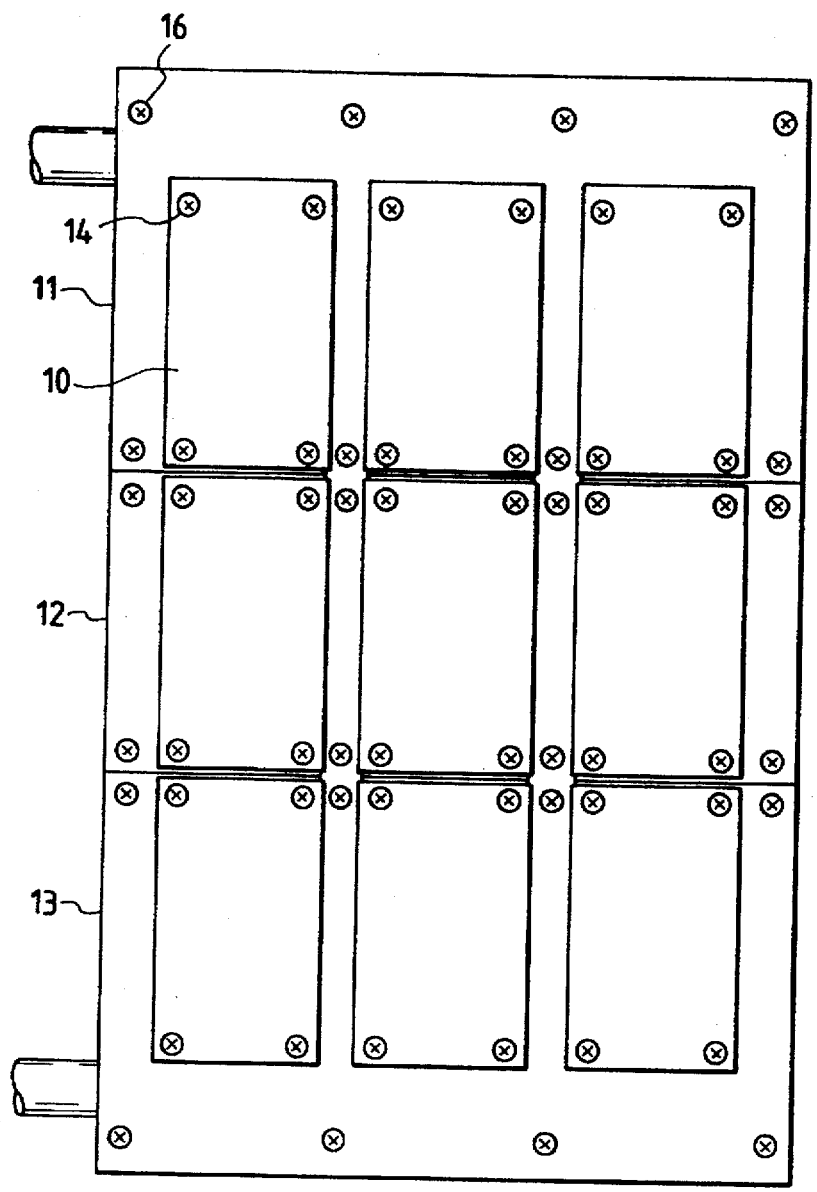
FIG. 6 is a plan view of the controller.
Figure 7:
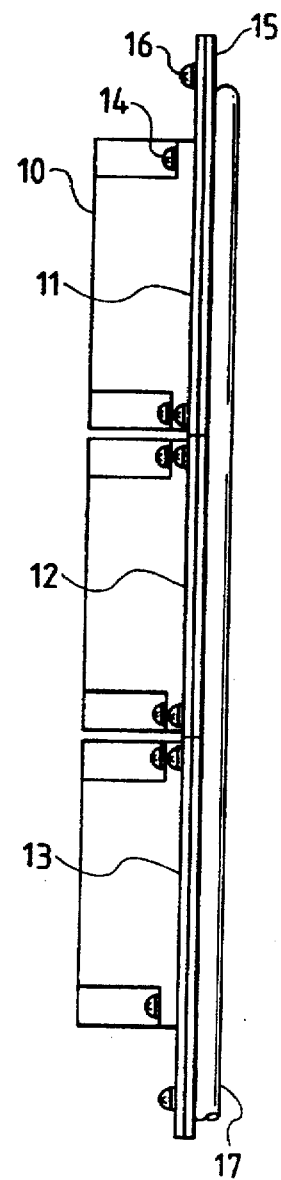
FIG. 7 is a side view of the controller in FIG. 6.
Figure 8:
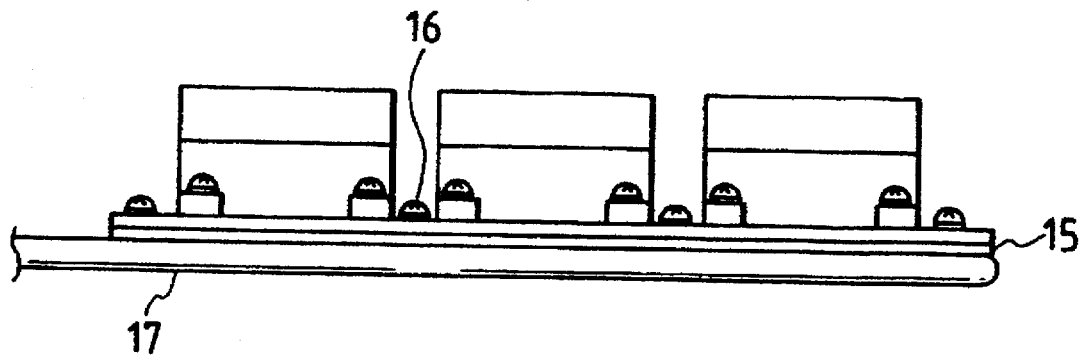
FIG. 8 is a bottom view of the controller in FIG. 6.

FIGS. 6, 7 and 8 shows a condition that a plurality of IGBTs 10 (Insulated Gate Bipolar) which are main components of the controller 1 are mounted on each of a IGBT mounting plate 11 (U phase), an IGBT mounting plate 12 (V phase) and an IGBT mounting plate 13 (W phase), by fastening screws 14. A cooling plate 15 is mounted, by joining screws 16, on the IGBT mounting plates 11, 12, 13 on which the IGBTs 10 are mounted in a manner that the IGBT mounting plates 11, 12 and 13 each are in tight contact with the cooling plate 15. The cooling plate 15 has a cooling pipe 17 joined thereto for cooling the cooling plate 15. The cooling plate 15 cools the IGBTs 10.

Figure 9:
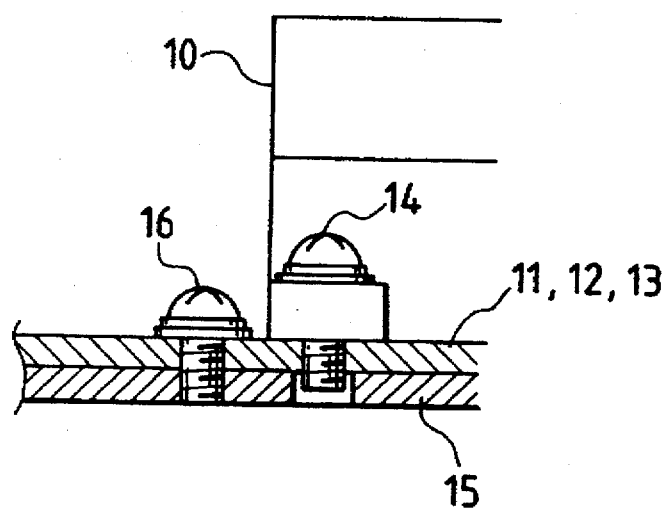
FIG. 9 is a sectional view showing an arrangement of cooling plate in the embodiment of the invention.

FIG. 9 shows the condition of the IGBT mounting plate 11, 12, 13 mounted on the cooling plate 15, in which the IGBT mounting plate 11, 12, 13 is secured to the cooling plate 15 by the joining screws 16, and the IGBTs 10 are mounted on the IGBT mounting plate 11, 12, 13 by the fastening screws 14. The cooling plate 15 has holes, at portions corresponding to the fastening screws 14, for allowing projection of the fastening screws 14 into the cooling plate 15. Further, a cooling effect is improved further by fastening directly the IGBTs 10 to the cooling plate 15 by the fastening screws. The cooling pipe 17 is arranged so as not to interfere with the joining screws 16.

Figures 10A, 10B:
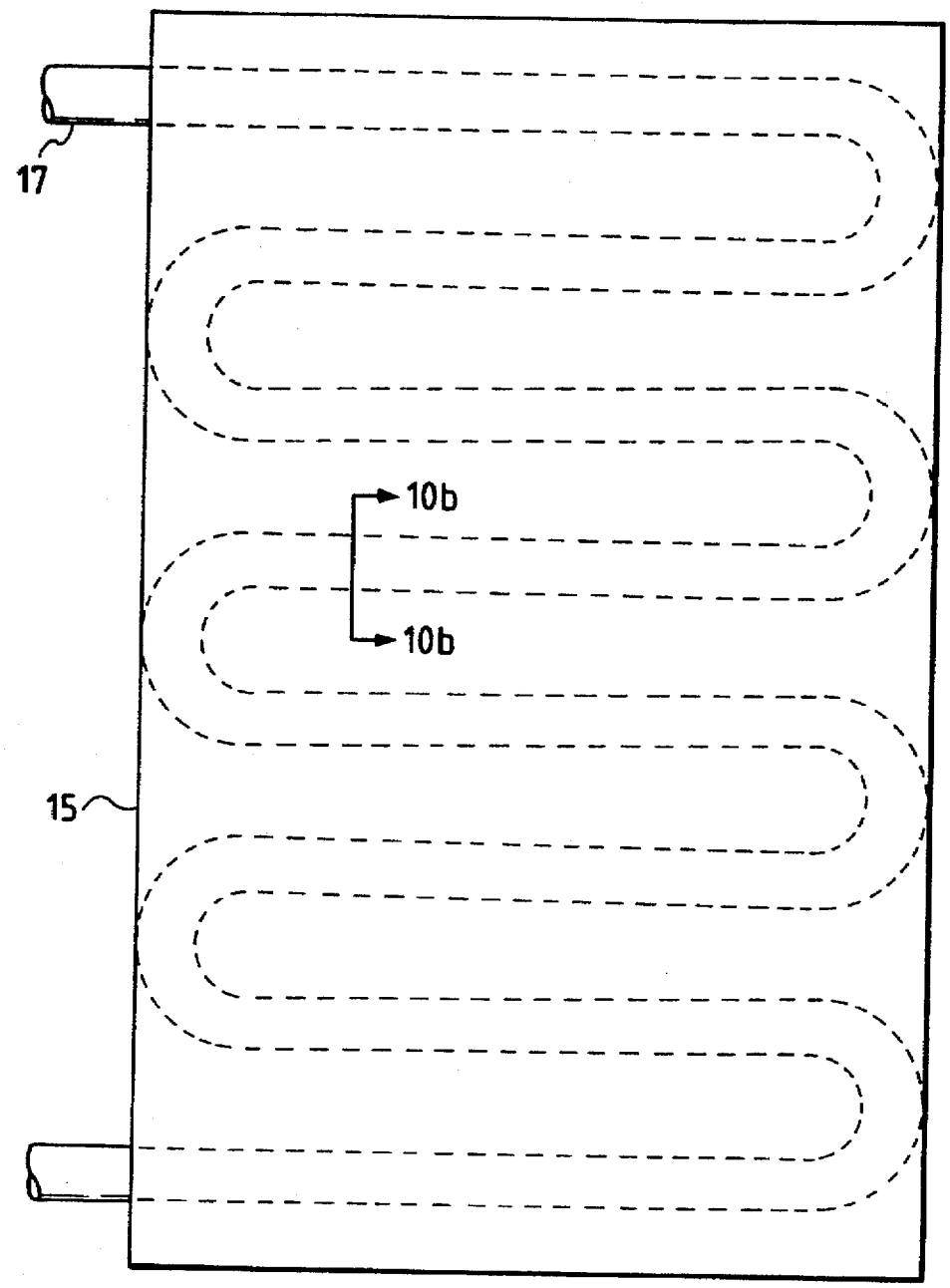
Figure 11A:
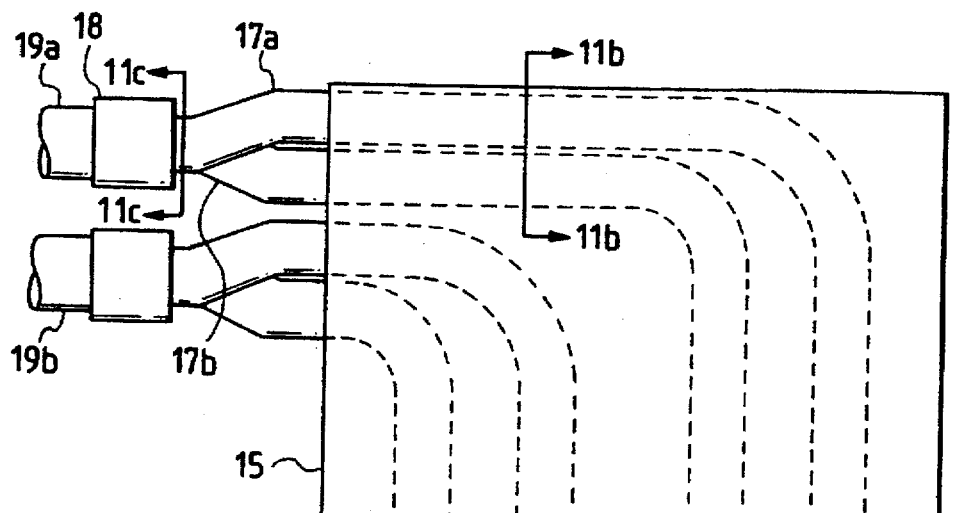
FIG. 11a is a plan view of controller, showing an arrangement of cooling pipe of another embodiment of the invention.
Figure 11B:
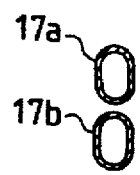
Figure 11C:
Figure 11D:
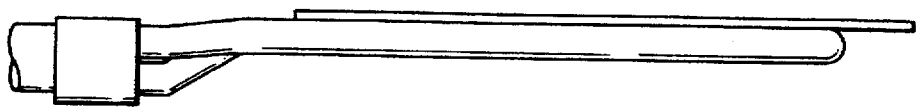

FIGS. 10a and 10b show a shape and arrangement of the cooling pipe 17 joined to the cooling plate 15. The cooling pipe 17 has an elliptical cross-sectional shape as shown in FIG. 10b. The cooling pipe 17 is joined to the cooling plate 15 so that a long axis of the ellipse is in parallel with the cooling plate 15, whereby a contact area is extended. The cooling pipe is meandering without interfering with the fastening or joining screws thereby to make the cooling pipe 17 long and to extend the contact area with the cooling pipe 17.

FIGS. 11a to 11d show an arrangement of two cooling pipes 17a and 17b provided for reducing passage loss of the cooling pipe 17. The two cooling pipes 17a, 17b are parallel to each other, and arranged full over the cooling plate 15 so that all the surface of the cooling plate 15 is cooled with the cooling pipes. The cooling pipes 17a and 17b are joined to distributors 18 at both ends, which distributors are joined to an inlet pipe 19a and an outlet pipe 19b, respectively.

Figure 12:
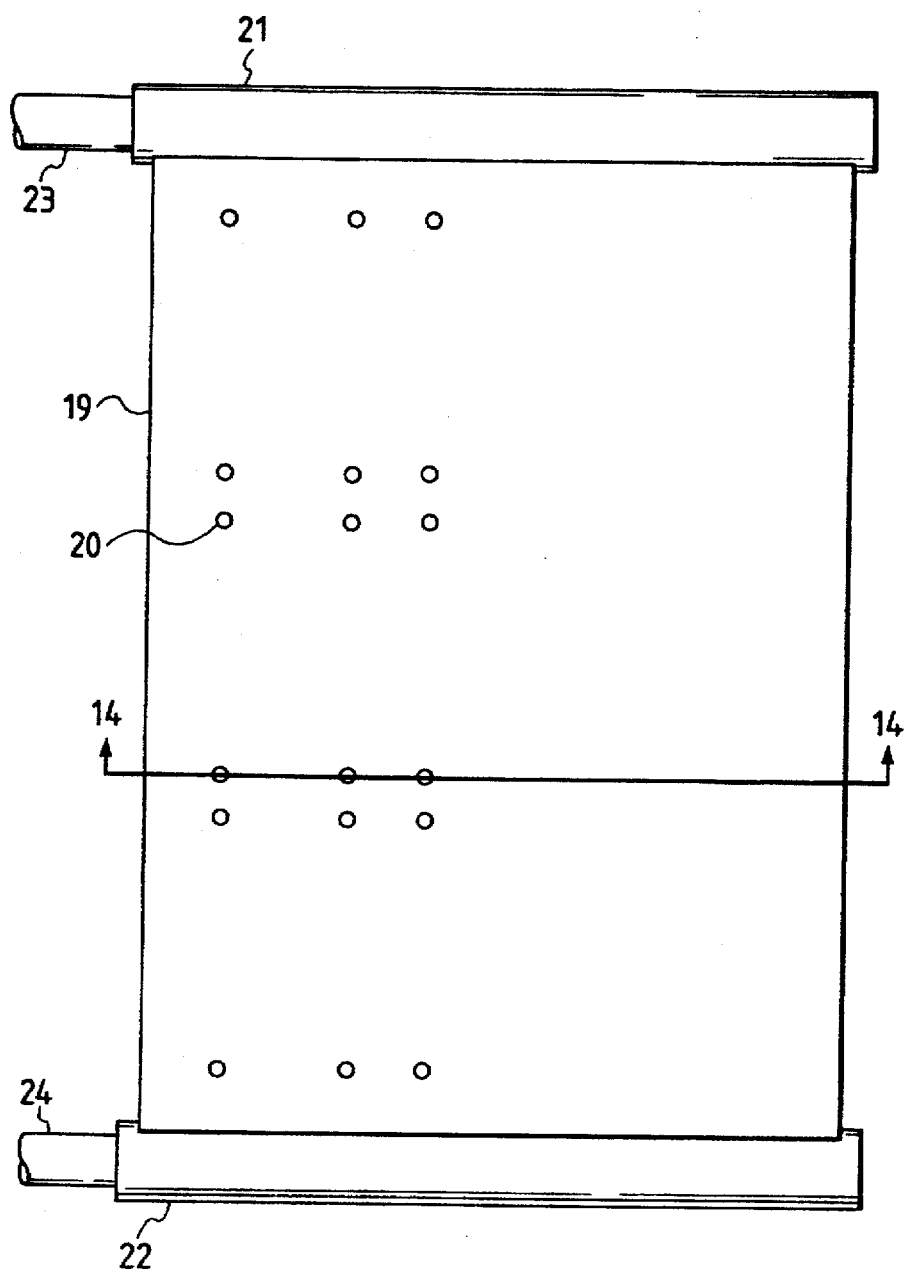
FIG. 12 is a view showing an arrangement of cooling pipe of another embodiment of the invention.
Figure 13:
FIG. 13 is a right side view of FIG. 12.
Figure 14:
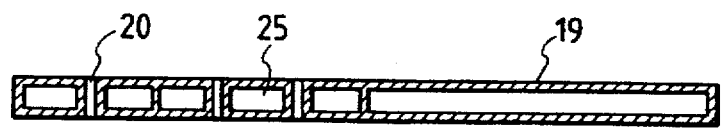
FIG. 14 is a sectional view taken along a line 14—14 of FIG. 12.

FIGS. 12, 13 and 14 show a construction for further reducing pressure loss and enlarging the contact area by utilizing a cooling tube 19 (formed by extrusion, for example) of multi-passage. The cooling tube 19 is provided with mounting screw holes 20, mounted on an inlet header 21 and an outlet header 22 at both ends. An inlet pipe 23 and an outlet pipe 24 are connected to the inlet and outlet header 21, 22, respectively. In this construction, a heat conductive area for cooling increases to four times, pressure loss is reduced to ⅕, compared with the cooling pipe, and its performance is improved greatly with a thus formed construction. Further, strength of the cooling tube itself is fairly strong and the cooling tube can be served as a base for mounting thereon other components.

As shown in FIG. 14, the cooling tube 19 has a plurality of coolant paths 25 each of which has a rectangular cross-section.

Figure 15:
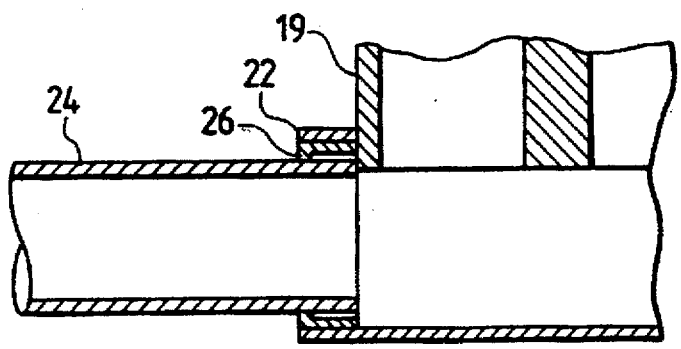
FIG. 15 is an enlarged sectional view of a part of FIG. 12.

FIG. 15 shows a construction that air-tightness and pressure resistance can be maintained by providing a spacer 26 in a connection portion of the outlet pipe 24 and the outlet header 22.

Figure 16:
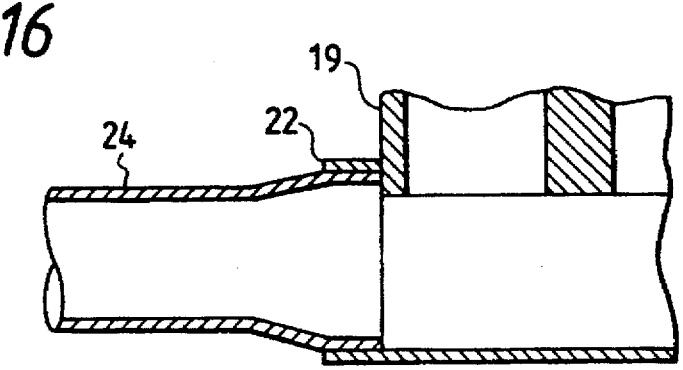
FIG. 16 is an enlarged sectional view of a part of FIG. 12, showing another embodiment of the invention.

FIG. 16 shows a construction in which the outlet pipe 24 is expanded and joined the outlet header 22 without using the spacer 26.

FIGS. 17 to 21b show cooling of the electric motor.

Figure 17:
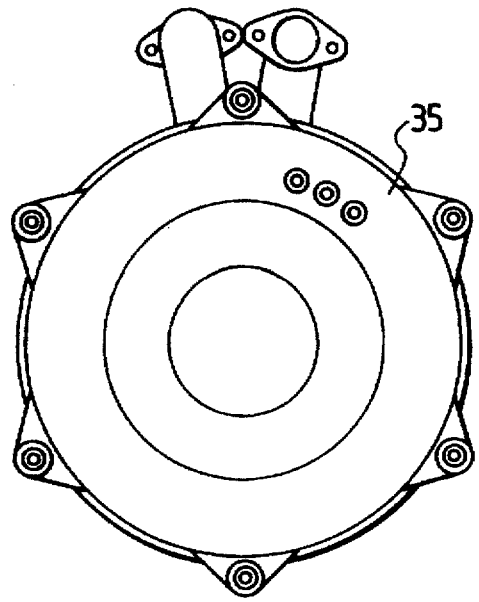
FIG. 17 is a side view of an electric motor used in the present invention.
Figure 18:
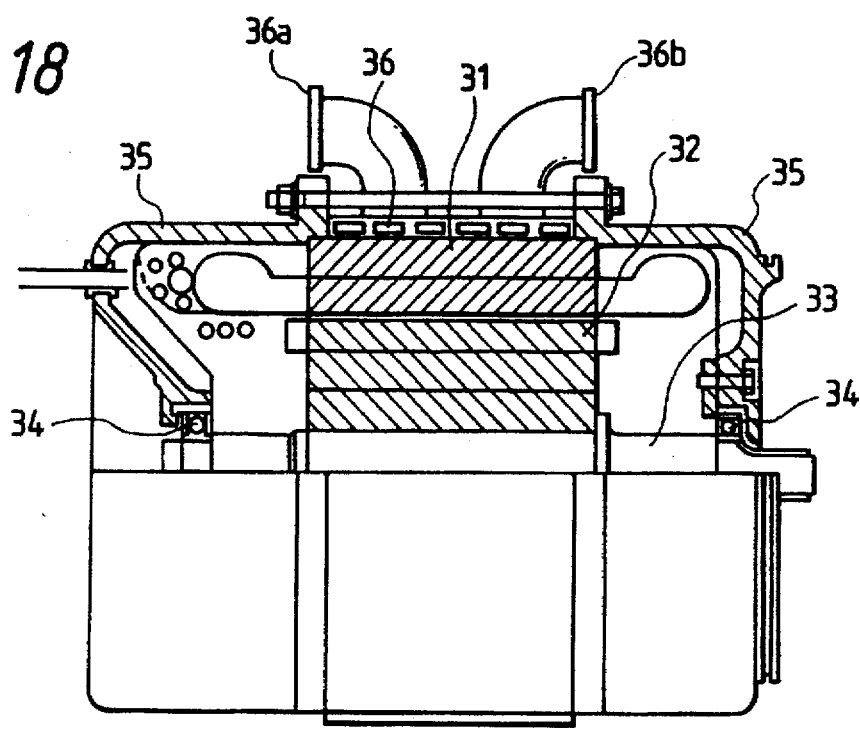
FIG. 18 is a sectional view of the electric motor in FIG. 17.

In FIGS. 17 and 18, an induction motor comprises a stator or stator core 31 receiving alternate electric power and generating rotating magnetic field, a rotor 32 rotated by the rotating magnetic field, a shaft 33 supporting the rotor 32, bearings 34 supporting the shaft 33, and a bracket 35 supporting the bearings 34. A outer ring 36, which has passages formed therein for coolant, is mounted on the outer periphery of the stator 31.

The outer ring 36 is formed by rounding plate-like drawn reduction material so as to suit to the scale of the outer periphery of the stator 31 thereby to form the coolant passages in annular shape.

Figure 19A:
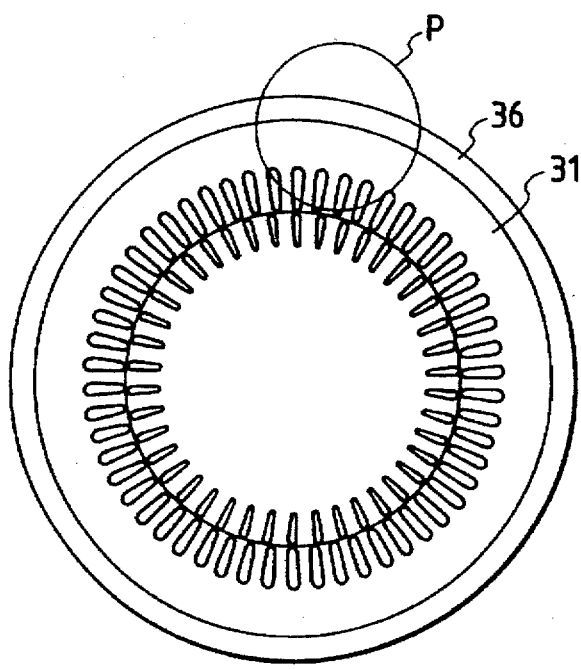
FIG. 19a is a side view of a stator portion of the electric motor in FIG. 17.
Figure 19B:
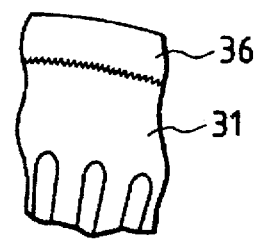
FIG. 19b is an enlarged view of a part of the stator portion in FIG. 19a, indicated by P.

The outer ring 36 is mounted on the stator 31 by press fit, whereby the outer ring 36 can be tightly contacted with the stator 31 and heat conductivity and cooling effect are improved. Further, as for material of the outer ring 36, it is effective to use softer material, such as aluminum, copper, than electromagnetic steel plate used for the rotor. This has an effect of elevating of the fitness of the outer ring 36 to the stator 31 because the outer ring 36 deforms when the outer ring 36 is press fitted into the stator 31. Further, the fitness can be further raised by forming fine knurling on the outer periphery of the stator as shown in FIGS. 19a, 19b, and biting the outer periphery of the stator 31 in the outer ring 36 when the outer ring 36 is inserted by press fit, whereby a contact area can be enlarged.

Figure 20:
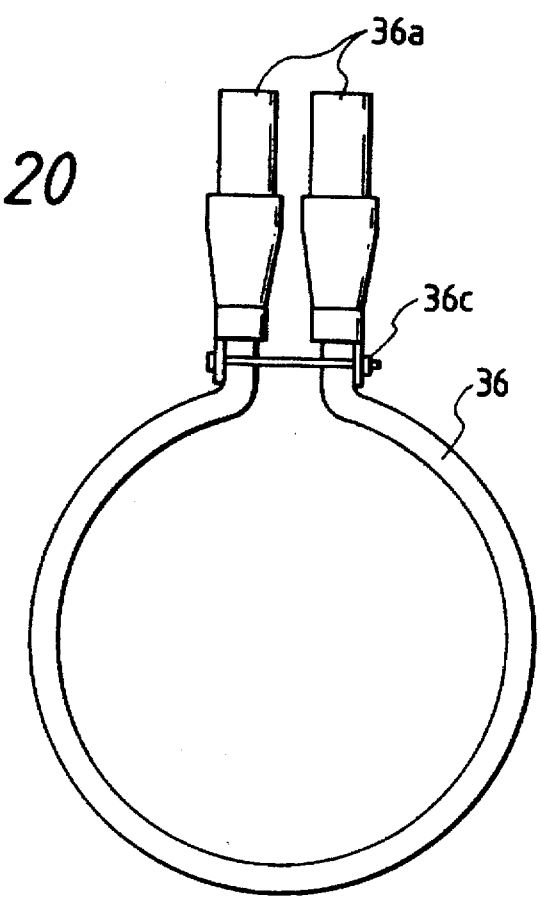
FIG. 20 is a side view of a component of the stator in FIG. 17.

As shown in FIG. 20, by providing the outer ring 36 with divided faces each extending in an axial direction and providing an adjustable mechanism 36c for adjusting a gap or width between the divided faces such as means of bolts and nuts, size of the contacting portion of the outer ring 36 with the stator 31 can be designed to be rough, and fitness or tightness between the outer ring 36 and the stator 31 can be raised with a simple construction. 36a represent an inlet or outlet.

Figure 21A:
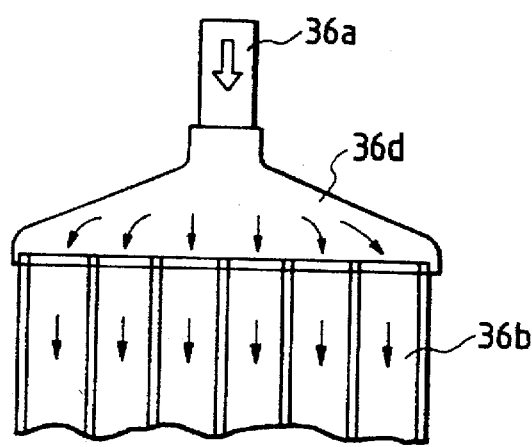
FIG. 21a is a front view of a component of a stator as shown in FIG. 17, which is another embodiment of the invention.
Figure 21B:
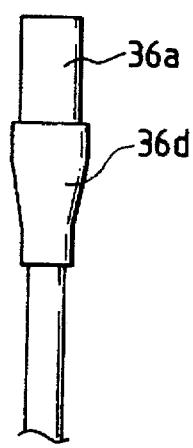

FIGS. 21a and 21b show an embodiment of the outer ring 36. The outer ring 36 has an inlet 36a, a distributor portion 36d joined to the inlet 36a, a plurality of parallel passage portions 36b joined to the distributor portion 36d, a collector portion (not shown, but similar construction to the distributor portion 36d) and an outlet (not shown, but similar construction to the inlet 36a). The coolant from the inlet 36a flows into the collector portion 36d to be distributed to each parallel passage portions 36b, flows in the parallel passage portions 36b, is collected into one flow by the collector portion, and then flows into the outlet. With this construction, passage resistance of the coolant is reduced, and a contact area between the coolant and the passage can be made large, so that effective cooling can be effected.

In case where it is unnecessary to consider so severely the passage resistance for the coolant, it is considered that the coolant passage is directly wound on the outer periphery of the stator 31 in a spiral or zig-zag fashion. In this case, the cooling passage is effective to be elliptical or rectangular cross-section. There are gaps between the stator and the cooling pipe mounted thereon, so that it is necessary to fill the gaps with well-heat-conductive resin. Further, by forming the cooling pipe in a spiral or zig-zag fashion in advance, and making the inner diameter of contacting surface of the cooling pipe with the stator 31 smaller than the diameter of the outer periphery of the stator 31, the assembled stator and the cooling pipe becomes excellent in fitness of them and in cooling performance.

The invention is explained along the embodiments on the above, it is possible to modify the present invention in various forms within the scope of the invention and these modifications are within the present invention. According to the present invention, coolant of anti-freeze solution is forcibly recirculated through the electric motor and the controller, so that the cooling system of an automobile can be attained which is capable of stable cooling irrespective of seasons.

Further, there are effects of assisting heating of the automobile room interior and suppressing reduction of the battery performance due to heat reserving, by effectively utilizing the heat generated in the motor or the controller.

Further, there is an effect that the electric motor and controller can be effectively cooled with a simple construction

What is claimed is:

1. A cooling system for an electric vehicle, comprising
   an electric motor for producing driving force,
   a controller for controlling said electric motor,
   a battery,
   a main cooling circuit including a pump and a radiator for forcibly recirculating coolant by said pump through said controller, said electric motor and said radiator to cool said controller and said electric motor, wherein said controller and said electric motor forms a heat source:
   a battery heat retaining circuit fluidly connectable to said main cooling circuit between said heat source and said radiator such that the coolant having passed through said heat source flows to heat said battery;
   a by-pass circuit fluidly connectable to said main cooling circuit such that the coolant bypasses said radiator; and
   means for selectively effecting connection or disconnection between said main cooling circuit and at least one of said battery heat retaining circuit and said bypass circuit according to outside temperature;
   wherein means is provided for changing an operation of said pump to recirculate the coolant at a predetermined minimum flow rate when the coolant, which has passed through said electric motor and said controller and is raised in temperature, is passed through said battery heat retaining circuit to heat said battery.

2. A cooling system according to claim 1, wherein said main cooling circuit includes a coolant recirculation line operatively connected with said controller and said electric motor so that said controller is disposed upstream of said electric motor with respect to a coolant flow in said coolant recirculation line to forcibly cool first said controller and then said electric motor with coolant.

3. A cooling system according to claim 2, wherein said coolant recirculation line includes a battery coolant circuit for recirculating the coolant, after the coolant has cooled said controller and said electric motor, through a battery, a heater coolant circuit for recirculating the coolant, after the coolant has cooled said controller and said electric motor, through a heater, and means for switching said battery coolant circuit and said heater coolant circuit so as to selectively allow the coolant having cooled said controller and said electric motor to recirculate through one of said battery and said heater.

* * * * *